United States Patent [19]

Yuey

[11] 4,168,394
[45] Sep. 18, 1979

[54] ELECTRIC PENETRATION ASSEMBLY

[76] Inventor: David D. Yuey, Box 1783, Huntington Beach, Calif. 92649

[21] Appl. No.: 836,664

[22] Filed: Sep. 26, 1977

[51] Int. Cl.$^2$ .................. G21C 13/02; H01B 17/30
[52] U.S. Cl. .................................. 174/151; 174/11 R; 174/12 BH; 174/152 R; 277/3
[58] Field of Search .......... 174/11 R, 11 BH, 12 BH, 174/15 BH, 16 BH, 17 CT, 18, 70 S, 151, 152 R, 152 E; 176/87; 277/2, 3, 12, 15, 72 R, 79; 339/94 A, 117 R, 117 P

[56] References Cited

U.S. PATENT DOCUMENTS

| | | | |
|---|---|---|---|
| 1,873,973 | 8/1932 | Marti | 174/11 BH |
| 3,328,039 | 6/1967 | McKeough | 277/3 |
| 3,781,453 | 12/1973 | Funk et al. | 174/11 R |
| 3,828,118 | 8/1974 | Bushek et al. | 174/11 R |
| 3,856,983 | 12/1974 | Fisher et al. | 174/11 R X |
| 3,882,263 | 5/1975 | Korner et al. | 174/11 R |
| 3,998,515 | 12/1976 | Panek | 174/11 R X |
| 4,035,575 | 7/1977 | Korner et al. | 174/11 R |
| 4,088,381 | 5/1978 | Harnett | 339/94 A |

FOREIGN PATENT DOCUMENTS 2155244  5/1973  Fed. Rep. of Germany ........... 174/151

*Primary Examiner*—Laramie E. Askin
*Attorney, Agent, or Firm*—Dominick Nardelli

[57] ABSTRACT

An electric penetration assembly for passing electrical conductors through the wall of a pressure vessel has at least one hermetically sealed electric feed-through conductor surrounded by an insulator. The insulator is symmetrical about an axis parallel with the conductors and is impervious with a pervious means disposed between the ends. The insulator is shaped wherein an external conical section is disposed between two external cylindrical sections and wherein the pervious means communicates with the conical section. The assembly is inserted into a header plate having at least one transverse aperture formed with a female conical section disposed between two female cylindrical sections. In the female conical sections are formed two axially spaced grooves for accepting O-ring type gaskets and the plate has at least one capillary bore formed therein which communicates with the conical section and with one face of the plate. This one face seals against a flange of a penetration nozzle of the vessel, with therebetween a gasket having interconnected double circumferential indentations or grooves. The bores in the plate communicate with these double indentations and with a pressure gauge so that any pressure therein can be monitored. A suitable clamping ring secures to the exterior surface of the plate to urge the assembly into the respective aperture and against the O-rings.

9 Claims, 5 Drawing Figures

ELECTRIC PENETRATION ASSEMBLY

FIELD OF THE INVENTION

This invention relates to an apparatus for making an electrical connection through a vessel wall wherein the connection should withstand high temperature and high pressure with a life span of over 40 years. The apparatus, more particularly, should be capable of being used with nuclear reactor vessels and is known in the art as an electrical penetration assembly.

BACKGROUND OF THE INVENTION

Electrical penetration assemblies are utilized to pass electrical conductors through containment vessels of nuclear power generating stations. The wall of the containment vessel, which is a relatively thick concrete combined with a steel dome, has a steel penetration nozzle which penetrates the wall. The nozzle, on its outer end, has a flange suitably welded thereto and may have a similar flange on the interior end. The electrical penetration assemblies are basically of two types, the canister type and the unitized header type. In the canister type, two header plates, each containing several feed-through modules, are mounted and sealed on the opposing flanges of a nozzle to form a canister wherein the inside may be pressurized with dry nitrogen to monitor any gas leakage out of the nozzle. In the unitized header electrical penetration assembly, a header plate is provided with one or more conductors or modules (i.e., a conductor surrounded with insulation which is sealed thereto). The modules are suitably affixed to the header plate which is bolted or fixed onto the exterior flange of the nozzle. Porting holes or narrow passageways interconnect all of the modules in the header plate thereby providing means to monitor any gas leakage.

Typical unitized header electrical penetration assemblies are taught by U.S. Pat. Nos. 3,781,453 and 3,828,118. The system described in 3,781,453 consists of a canister containing two epoxy resin bushings having the conductors fixed at each end and the conductors are spliced internally of the canister. The system described in U.S. Pat. No. 3,828,118 consists of modules made of glass-reinforced, anhydride-cured epichlorohydrin bisphenol A-type epoxy resin with conductors bonded therebetween. Anhydride-cured epoxy resin undergoes reversion due to hydrolysis when subjected to super heated steam as would be encountered during an accident to a reactor system. Furthermore, such resins show considerable degradation under thermal aging simulating 40 years of design life and show a decrease in strength and flexibility when subjected to gamma radiations of over 100 million rads.

A typical canister type is taught by U.S. Pat. No. 3,856,983 wherein each conductor passes through a seal means on each end of the penetration nozzle. As is obvious by studying this patent, canister types are inherently complicated and costly.

Although the prior art teaches the bolting of a header plate onto the flange of a penetration nozzle for unitized header types, the prior art does not teach how the seal therebetween is to be monitored for leaks.

OBJECTS OF THE INVENTION

An object of this invention is to provide an improved means and method for providing hermetically sealed electrical feed-through or penetration structures or assemblies.

Another object of this invention is to provide an improved method of making and constructing an electric feed-through assembly which can withstand the abnormal conditions during a loss of coolant accident in a nuclear reactor.

Another object of this invention is to provide a medium voltage power feed-through structure suitable for electrical power supply for the purpose described and in the environment mentioned hereinabove, allowing for both longitudinal and lateral movement of the conductors during a three phase short circuit while maintaining sealed integrity against gas leaks.

Another object of this invention is to provide an improved means and method of maintaining pressure and monitoring gas leakage between the header plate and the welded flange for an unitized header type electrical penetration assembly so that plates and flanges with flat surfaces may be utilized.

Another object of this invention is to provide a suitable flat gasket between the flange and header plate, wherein the gasket has opposing circumferential indentations or grooves interconnected together and a passageway in the header plate communicates with these grooves and with the gas monitoring system in the header.

These and other objects and features of advantage will become more apparent after studying the following embodiments of my invention, together with the appended drawing.

DETAILED DESCRIPTION OF THE DRAWING

Figure 1:
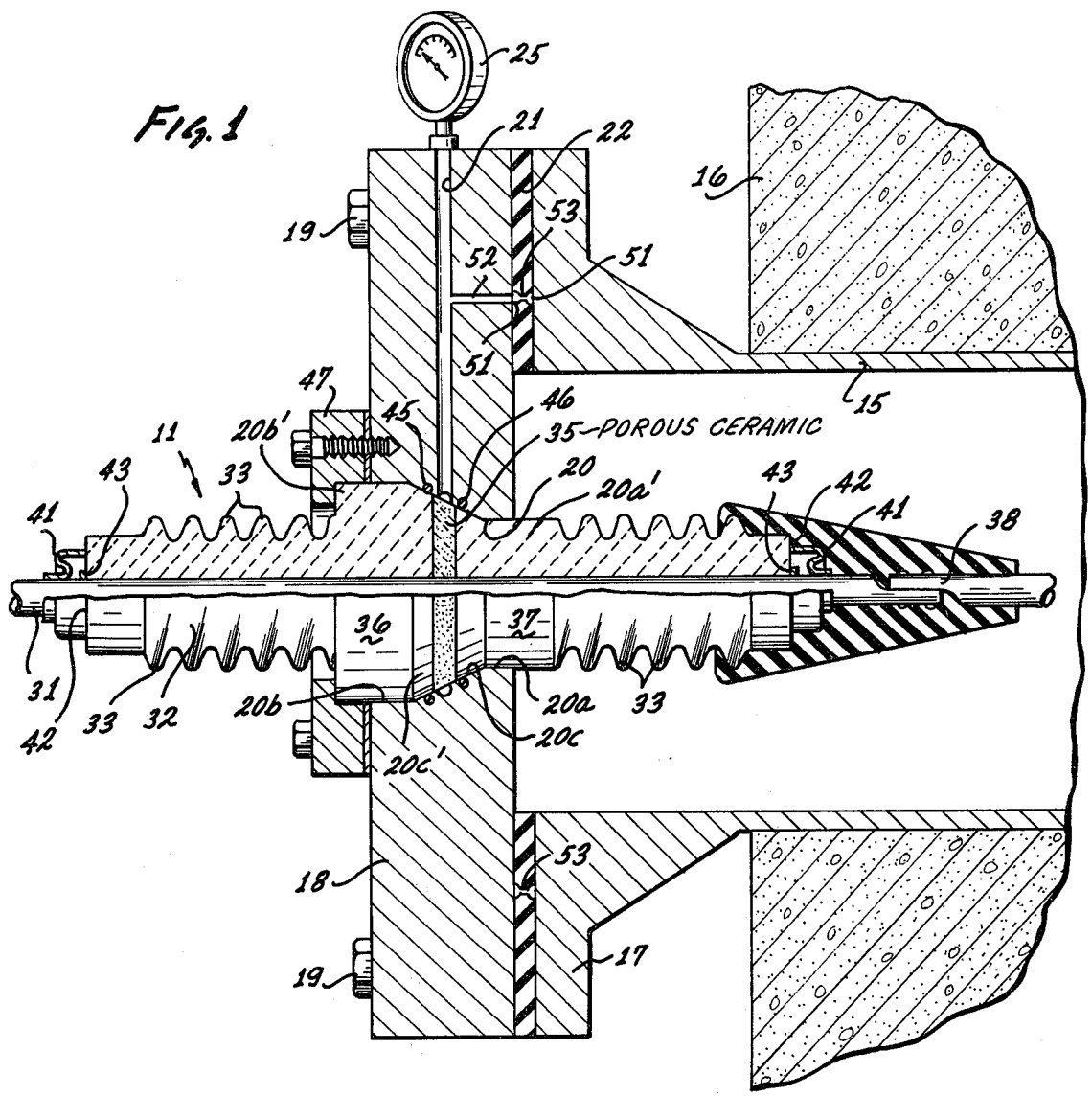
FIG. 1 is an axial cross-section of one embodiment of my novel unitized header type electrical penetration assembly as it would be typically mounted onto a header plate, and a penetration nozzle.

Referring to FIG. 1, there is shown one embodiment of electrical penetration assembly 11 employing my novel features, as would be typically installed in a penetration nozzle 15, piercing a concrete wall 16 enclosing a nuclear reactor (not shown) which would be located to the right of FIG. 1. The nozzle 15 is preferably made of an alloy steel and has an annular steel flange 17 fixed to the end thereof. The nozzle 15 is normally cylindrical and the flange 17 has its exposed surface perpendicular to the nozzle axis. Suitably bolted by bolts 19 to flange 17 is a steel header plate 18 having internal bores or passageways 21 suitably placed in a manner that will be made more apparent hereinafter, and having at least one transverse bore 20. Between the flange 17 and plate 18 is disposed an annular gasket 22 having novel features, as will be explained hereinafter. Into each transverse bore is inserted an electrical penetration assembly 11. The passageways 21 are made to communicate with each transverse bore 20 and to a pressure gauge 25 in a manner such as is taught in U.S. Pat. No. 3,828,118. One will note that the transverse bore 20 consists of two cylindrical outer bore sections 20a and 20b connected by a conical section 20c so that the assembly 11 can be removed from the outside of the reactor containment vessel represented by wall 16.

The embodiment of the electrical penetration assembly 11 shown in FIG. 1 has a central conductor 31 preferably made of copper surrounded by ceramic insulator 32 preferably shaped as shown. The insulator 32 has the necessary annular ribs 33 to provide a high resistance to electrical leakage patterns. Between the ribs 33 the insulator has two cylindrical portions or sections 20a' and 20b' disposed on each side of a tapered portion or section 20c' to match the respective cylindrical sections 20a and 20b and the tapered section 20c on the transverse bore in the header plate 18. Within the tapered section 20c' of the insulator 32, a gas pervious means, in the form of a porous ceramic section 35, is placed between non-porous ceramic sections 36 and 37. The porous section 35 is, for example, made of equal amounts of alumina and silica with 100 micron-sized pores and is disc shaped. The sections 36 and 37 are, for example, made of alumina which is formed dense and rigid and with a glazed surface. Section 35 is bonded to sections 36 and 37 with a suitable glaze and the bonding is preferably done in the green state before firing of the ceramic to achieve uniform bonding strength. The ends of the conductor 31 are provided with suitable terminals such as terminal 38 which is called a NEMA type lug terminal.

Since the bonding between the copper conductor 31 and the insulator 32 is inherently poor, I have provided a flexible metal apertured cap 41 at each end of the insulator 32, the cap 41 is shaped as shown to provide a lateral or axial movement between the conductor and insulator. The cap 41 is made of, for example, Monel, which is brazed to the copper conductor 31 and brazed to an annular metallized surface 42 on the insulator 32, which surface is made in a well known manner. To prevent relatively large axial movements, a copper ring 43 is brazed on the conductor 31 adjacent to each end of the insulator 32. These rings 43 are located on the copper when the copper is at ambient temperature and then bonded thereto.

The electrical penetration assembly 11 is installed as shown, with a pair of suitable O-ring seals 45 and 46 disposed in suitable grooves in the header 18 and a retaining ring 47 bolted to the outside of the header and holding the assembly 11 in place. As in the prior art, the passageway 21 is filled with nitrogen. The nitrogen communicates with a pair of opposing circumferential grooves 51 in gasket 22 through a passageway 52. The gasket 22 has aperture 53 between grooves 51. Therefore, if any leaks develop, the nitrogen would pass through the porous ceramic 35 and through the space between the gasket 22 and header 18 or flange 17 and the pressure read on the gauge 25 would drop.

Figure 2:
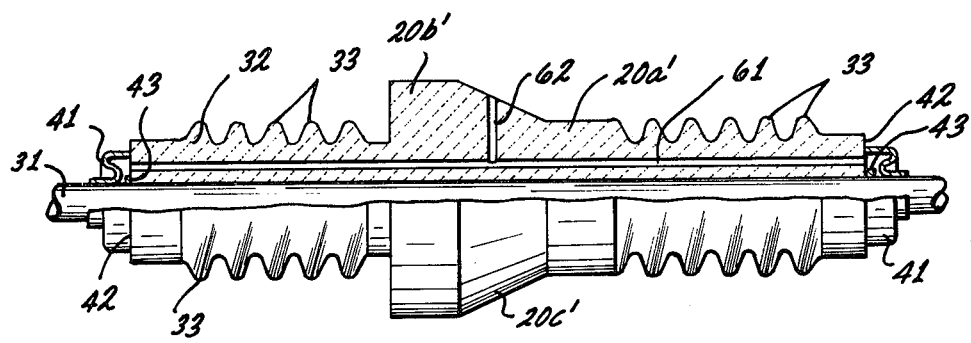
FIG. 2 is an axial cross-section of another embodiment of my electrical penetration assembly removed from the penetration nozzle and header plate.

Referring to FIG. 2, another embodiment of my electrical penetration assembly is shown, wherein like numbered items refer to the same functional thing. This embodiment also has the electrical conductor 31, the ceramic insulator 32 with ribs 33, cylindrical sections 20a' and 20b' and tapered section 20c', flexible end caps 41, metallized surfaces 42 and rings 43. Since no porous section 35 is provided, as this insulator 32 is made of a dense alumina, I have provided a T-shaped leakage path or ducts 61 and 62 with path 61 parallel to the conductor 31 and opening at opposite ends of the insulator 32 within the end caps and with path 62 communicating with path 61 and opening at the tapered section 20c'. Now, when this embodiment is installed, such as the embodiment shown in FIG. 1, path 62 communicates with the passageway 21 to perform a like function.

Figure 3:
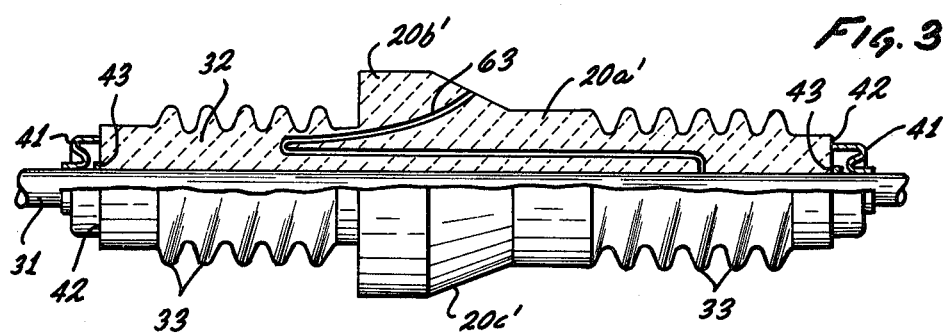
FIG. 3 is an axial cross-section of still another embodiment of my electrical penetration assembly.

Referring to FIG. 3 there is shown another embodiment wherein like numbered items refer to the same functional thing. This embodiment also has the electrical conductor 31, insulator 32 with ribs 33, cylindrical sections 20a', 20b' and tapered section 20c', flexible end caps 41, metallized surfaces 42 and rings 43. This embodiment also eliminates the porous section 35, but includes a zigzag duct 63 which terminates against the conductor 31, as shown, and opens at the tapered section 20c'. Also, when this embodiment is installed, such as in the embodiment of FIG. 1, path 63 communicates with path passageway 21 to perform a like function.

Figure 4:
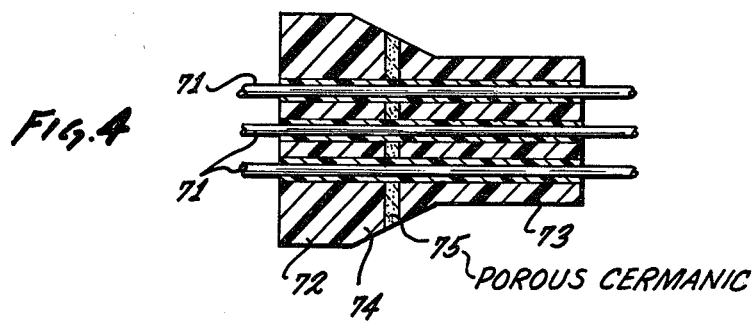
FIG. 4 is an axial cross-section of still another embodiment of my electrical penetration assembly, more suitable for low voltage multi-conductor application.

Referring to FIG. 4, there is shown still another embodiment which has utility for low voltage application. This embodiment has a plurality of conductors 71, preferably seven conductors, arranged with six conductors evenly disposed around a central conductor. The conductors 71 are covered by a suitable insulator shaped similar to the insulator of the embodiment in FIG. 1, but made simpler. The insulator has two outer cylindrical sections 72 and 73 of different diameters connected by a conical section 74. At the conical section is placed a wafer-shaped porous insulator 75 while on each side there is disposed a dense insulation material as will be further described. This electrical penetration assembly can also be installed in a system shown in FIG. 1 so that the porous insulator 75 communicates with passageway 21.

Since the bonding between conductor 71 and the insulator should prevent leakage at extreme conditions and after long life, the preferred process for making these electrical penetration assemblies, as shown in FIG. 4, will now be explained. The coefficient of thermal expansion for any conductor material such as copper is greater than most thermosetting dielectric materials. Further, shrinkage of the thermosetting dielectric materials after molding tends to move in the opposite direction from the conductors causing some leak paths between the conductors and the dielectric materials. The process described herein consists of applying a flexible coating between the conductors and the dielectric materials to produce a bonding in-between insuring a hermetically sealed thermosetting dielectric material on the conductors.

The preferred process includes the following steps:

1. Each copper conductor is cleaned in an alkaline solution, rinsed and descaled in an ammonium persulfate solution (90 gms/liter), rinsed with de-ionized water and dried.

2. Each cleaned conductor is immersed in gamma-glycidoxypropyltrimethoxysilane and drained. Treated conductors are air dried for approximately 30 minutes.

3. A coating of solventless silicone resin is applied on each conductor, consisting of (a) a solventless liquid organosilicone resin containing 30 to 65 mol percent $C_6H_5SiO_{3/2}$ units, 15 to 30 mol percent $CH_3(CH_2=CH)SiO$ units, 20 to 40 mol percent $(CH_3)_2SiO$ units, and 0 to 5 mol percent $(CH_3)_3SiO_{\frac{1}{2}}$ units; (b) an organopolysiloxane fluid having at least two $\equiv$SiH groups per molecule, the organopolysiloxane being of the formula

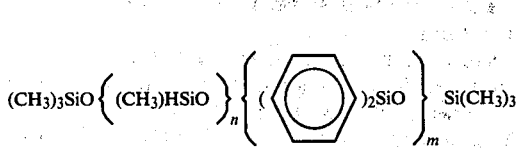

in which n is an integer having a value of 2 or more, m is an integer having a value of 1 or more, n and m having a total value sufficient to result in a fluid having a viscosity of from 20 to 2000 cs. at 25°., the diphenylsiloxy units comprising from about 30 to 40 mol percent of said organopolysiloxane, which is present in the mixture in an amount sufficient to provide from 0.75 to 1.5 mol of $\equiv$SiH per mol of vinyl substituent in (a); and (c) a platinum catalyst such as chloroplatinic acid containing approximately 10 p.p.m. by weight of platinum.

4. Each conductor is loaded into a mold retention insert, such as porous insulator 75, and preheated in an oven at 200° C. The applied coating on the conductors is cured at 200° C. for one hour. A complete cure of the coating is not necessary so that a maximum bonding may be obtained on the dielectric materials to be applied next.

5. The dielectric material consists of solventless silicone resin as described in (3) used in conjunction with filler materials of approximately 60 to 75 percent by weight of alumina powder or barium titanate or silica powder treated with gamma-glycidoxypropyltrimethoxysilane and between 1 to 3 percent of coarse-grain magnesium oxide to enhance the thermal conductivity. An example of the composition of the dielectric materials is as follows:

(a) and (b): 34.5 gm
(c): 3.5 gm
Alumina Powder: 60 gm
50-mesh Magnesium Oxide: 2 gm 6. The above composition is cast into the mold and cured at 200° C. for 16 hours. The electric feed-through module thus produced is hermetically sealed on each conductor. The dielectric material can withstand gamma irradiation to $2 \times 10^{10}$ rads, thermal aging to 40 years design life, superheated steam at 600° F. under pressure of 1200 psig without losing its hermeticity.

Making the hermetically sealed electric penetration assembly feed-through modules, as shown in FIG. 4, by the standard vacuum cast method, ordinarily takes about 16 hours at 200° C. This is not very suitable for high volume production. By the pressure gelation method on the other hand, it takes only about 30 minutes. Further, electric feed-through modules produced by the pressure gelation process are void free, more densely packed and better sealed with conductors because of the pressure exerted on the material during gel. As a result, considerable improvement can be achieved in the mechanical tensile strength, volume resistivity, insulation resistance and corona extinction level for high voltage applications.

Figure 5:
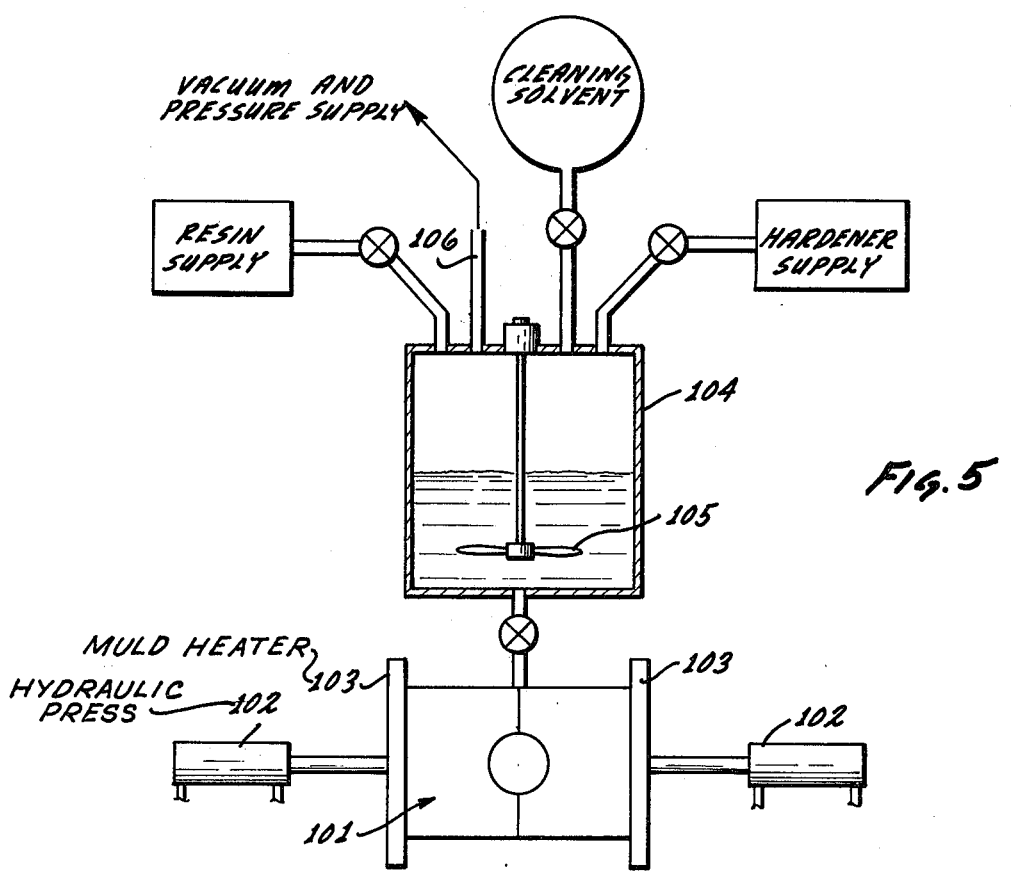
FIG. 5 is a schematic of a novel method of making the embodiment shown in FIG. 4.

Referring to FIG. 5, the preferred apparatus and method of operation for making modules shown in FIG. 4 is now described:

1. After a coating of solventless silicone resin is applied on each conductor as described in (3) of the above mentioned process, each conductor is loaded into the mold 101 for pressure gelation molding.

2. The automatic pressure gelation system consists of a hydraulic press 102 to close the molds, a mold heating system 103 with thermostat control, a resin supply tank 104 with stirrer 105. The solventless silicone resin and the filler materials are first thoroughly mixed under vacuum drawn through tube 106. Then nitrogen pressure is applied through tube 106 so as to deliver the resin mixture into the mold 101. The mold is pre-heated to 200° C. and material in the mold is held under a constant nitrogen pressure of approximately 15 psig during gel.

3. After about 30 minutes, the hermetically sealed electric feed-through module is cured and can be taken out of the mold. The module may be placed in an air-circulating oven preheated to a lower temperature to allow slower cooling rate to prevent any thermal shock during sudden cooling which may produce cracking of the molded parts.

Examples of typical resin mixtures used to make insulators 72 and 73 of FIG. 4 are:

1. Solventless silicone resin
Dow Corning R-4-3157 Base: 34.5 gm
Curing agent R-4-3157: 3.5 gm
Tabular alumina: 60 gm
350-mesh magnesium oxide: 2 gm
Process: Pressure gelation molding at 200° C. & 15 psig during gel for 30 minutes, followed by post-curing at 150° C. for 4 hours.

2. PMDA
Pyromellitic dianhydride: 8.5 gm
N-glycidelphthalimide: 35 gm
Tabular alumina: 60 gm
Process: Compression molding at 400° F. and 1,500 psig.

Having described the preferred embodiments of my invention, one skilled in the art could devise other embodiments without departing from the spirit of my invention. Therefore, my invention is not to be considered as limited to the embodiments described but includes all embodiments which fall within the scope and breadth of my appended claims.

I claim:

1. In combination:
a concrete wall capable of shielding radiation;
a penetration nozzle piercing said wall from side to side;
an annular flange fixed on one end of said nozzle;
a header plate removably mounted to said flange;
an annular gasket disposed between said flange and said plate;
said gasket having a pair of opposing surfaces and each surface having an annular groove formed therein;
said gasket having at least one aperture communicating with both of said grooves;
said header plate having at least one transverse bore wherein said bore has two cylindrical bore sections of different diameters connected by a tapered bore section with the larger of the cylindrical bore sections disposed removed from said nozzle;
said header plate having a first passageway communicating with said tapered section and having one end extending to an exterior surface of said plate, and said plate having a second passageway communicating with said first passageway and having one end extending to the surface of said plate adjacent to said flange and communicating with said grooves;
an electric penetration assembly disposed within said transverse bore of said plate;
sealing means disposed between said plate and said assembly and within said tapered section;

a retaining ring removably clamped to said plate and securing said assembly to said plate.

2. An electrical penetration assembly comprising:
an electrical conductor;
an insulator disposed around said conductor with both ends of said conductor exposed;
said insulator having two cylindrical surfaces disposed on each side of a conical surface and said conical surface being disposed substantially at the middle thereof;
a gas permeable pervious means disposed in said insulator and between the ends thereof;
an annular flexible end cap permanently bonded to each end of said insulator and to said conductor.

3. The assembly of claim 2 wherein said gas permeable means comprises:
an annular disc made of a porous ceramic; and
said disc is disposed within said conical section.

4. The assembly of claim 3 wherein each of said end caps comprises:
an annular thin metal member and shaped so that the outer periphery is bonded to said insulator and the inner periphery is bonded to said conductor.

5. The assembly of claim 2 wherein said gas permeable means comprises:
said insulator having a T-shaped duct formed therein and having one duct disposed parallel to said conductor and having the other duct communicating with said first duct and opening at the exterior surface of said tapered section.

6. The assembly of claim 5 wherein each of said end caps comprises:
an annular thin metal member and shaped so that the outer periphery is bonded to said insulator and the inner periphery is bonded to said conductor.

7. The assembly of claim 2 wherein said gas permeable means comprises:
said insulator having a zigzag duct terminating against said conductor and opening at the exterior surface of said tapered section.

8. The assembly of claim 7 wherein each of said end caps comprises:
an annular thin metal member and shaped so that the outer periphery is bonded to said insulator and the inner periphery is bonded to said conductor.

9. An electrical penetration assembly comprising:
a plurality of parallelly spaced conductors;
an insulator disposed around said conductors with both ends of said conductors exposed;
said insulator having a conical surface and two cylindrical surfaces disposed on each side of said conical surface;
said insulator comprised of a solventless silicone resin with a filler material of between 60 to 75 percent by weight of said resin;
said filler material selected from the group consisting of alumina, barium titanate, silica and magnesia, all in a powdered form;
said insulator also comprised of a porous ceramic disc disposed between said silicone resin and within said conical surface.

* * * * *